(12) United States Patent
Lambert et al.

(10) Patent No.: US 8,813,802 B1
(45) Date of Patent: Aug. 26, 2014

(54) PNEUMATIC TIRE WITH RUBBER COMPONENT CONTAINING THERMOPLASTIC/FILLER COMPOSITE

(71) Applicant: The Goodyear Tire & Rubber Company, Akron, OH (US)

(72) Inventors: Isabelle Lea Louise Marie Lambert, Arlon (BE); Nihat Ali Isitman, Ettelbruck (LU); Luisa Fernanda Munoz Mejia, Arlon (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/078,581

(22) Filed: Nov. 13, 2013

(51) Int. Cl.
*B60C 5/00* (2006.01)
*C08K 9/00* (2006.01)
*C08K 3/34* (2006.01)

(52) U.S. Cl.
USPC ............ 152/450; 523/216; 524/261; 524/492

(58) Field of Classification Search
USPC .................... 152/450; 523/216; 524/261, 492
See application file for complete search history.

(56) References Cited

U.S. PATENT DOCUMENTS

| | | | |
|---|---|---|---|
| 4,861,644 A | 8/1989 | Young et al. | |
| 6,114,023 A | 9/2000 | Schwarz et al. | |
| 7,432,321 B2 | 10/2008 | Joshi et al. | |
| 7,714,041 B2 | 5/2010 | Schmitz et al. | |
| 7,906,602 B2 * | 3/2011 | Schmitz et al. | 526/335 |
| 8,048,941 B2 * | 11/2011 | Koster et al. | 523/216 |
| 8,539,999 B2 | 9/2013 | Pingenat et al. | |
| 2005/0032960 A1 * | 2/2005 | Kishimoto et al. | 524/432 |
| 2008/0047647 A1 | 2/2008 | Raskas | |
| 2008/0118738 A1 | 5/2008 | Boyer et al. | |
| 2008/0286593 A1 | 11/2008 | Boyer et al. | |
| 2009/0311504 A1 | 12/2009 | Boyer et al. | |

\* cited by examiner

*Primary Examiner* — Kara Boyle
(74) *Attorney, Agent, or Firm* — John D. DeLong

(57) ABSTRACT

The present invention is directed to a pneumatic tire comprising at least one component, the at least one component comprising a rubber composition, the rubber composition comprising:
  at least one diene based elastomer; and
  from 1 to 30 parts by weight, per 100 parts by weight of elastomer (phr), of a particulate composite comprising ultra high molecular weight polyethylene, an inorganic filler, and a network of interconnecting pores communicating throughout the particulate composite, the pores constituting at least 35 percent by volume of the particulate composite.

6 Claims, 1 Drawing Sheet

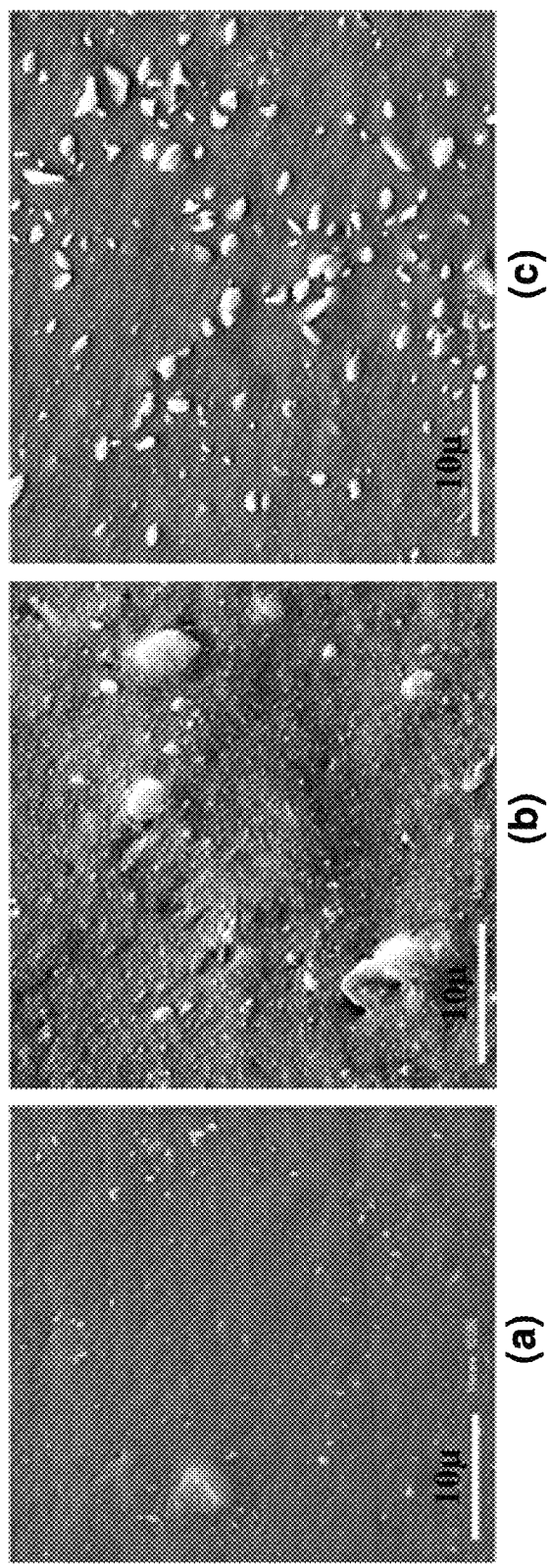

PNEUMATIC TIRE WITH RUBBER COMPONENT CONTAINING THERMOPLASTIC/FILLER COMPOSITE

BACKGROUND

Achieving satisfactory performance in wet and icy conditions requires special characteristics from a tire.

Performance in icy conditions can be achieved by several different means. One way to improve performance in these conditions is to use a softer tread compound which increases the coefficient of friction between the tire and the road. This typically has the detrimental effects of increasing both the rolling resistance and wear of the tread.

There remains a need for a tire tread which provides improved coefficient of friction with the road surface without increased wear of the tire tread.

SUMMARY

The present invention is directed to a pneumatic tire comprising at least one component, the at least one component comprising a rubber composition, the rubber composition comprising:

at least one diene based elastomer; and from 1 to 30 parts by weight, per 100 parts by weight of elastomer (phr), of a particulate composite comprising ultra high molecular weight polyethylene, an inorganic filler, and a network of interconnecting pores communicating throughout the particulate composite, the pores constituting at least 35 percent by volume of the particulate composite.

BRIEF DESCRIPTION OF THE DRAWING

FIG. 1 shows photomicrographs of a rubber samples.

DESCRIPTION

There is disclosed a pneumatic tire comprising at least one component, the at least one component comprising a rubber composition, the rubber composition comprising:

at least one diene based elastomer; and from 1 to 30 parts by weight, per 100 parts by weight of elastomer (phr), of a particulate composite comprising ultra high molecular weight polyethylene, an inorganic filler, and a network of interconnecting pores communicating throughout the particulate composite, the pores constituting at least 35 percent by volume of the particulate composite.

The rubber composition include a particulate composite comprising ultra high molecular weight polyethylene, silica, and a network of interconnecting pores communicating throughout the particulate composite, the pores constituting at least 35 percent by volume of the particulate composite. Suitable particulate composite may be obtained as Teslin from PPG Industries.

The particulate composite may be made for example as described in any of U.S. Pat. No. 4,861,644; U.S. Pat. No. 6,114,023; US2008/0118738; US2008/0286593; and US2009/0311504.

As described therein, the particulate composite comprises ultra high molecular weight polyethylene and inorganic filler. The ultra high molecular weight polyethylene may be characterized by its intrinsic viscosity, which is well recognized by those skilled in the art. The molecular weight of the ultra high molecular weight polyethylene is related to the intrinsic viscosity through the equation $M = 5.37 \times 10^4 [\eta]^{1.37}$ where M is the nominal molecular weight and $\eta$ is the intrinsic viscosity in deciliters/gram. In one embodiment, the ultra high molecular weight polyethylene has an intrinsic viscosity ranging from 10 to 39 deciliters/gram. In one embodiment the ultra high molecular weight polyethylene has an intrinsic viscosity ranging from 14 to 39 deciliters/gram. In one embodiment the ultra high molecular weight polyethylene has an intrinsic viscosity ranging from 18 to 39 deciliters/gram.

The particulate composite further includes an inorganic filler. The filler can comprise water-insoluble siliceous materials, metal oxides, and/or metal salts. Examples of suitable siliceous particles include particles of silica, mica, montmorillonite, including montmorillonite nanoclays such as those available from Southern Clay Products under the tradename CLOISITE®, kaolinite, asbestos, talc, diatomaceous earth, vermiculite, natural and synthetic zeolites, cement, calcium silicate, aluminum silicate, sodium aluminum silicate, aluminum polysilicate, alumina silica gels, and glass particles. Silica and the clays are often used. Of the silicas, precipitated silica, silica gel, or fumed silica are most often used. Any of the previously mentioned siliceous particles may include treated (e.g., surface treated or chemically treated) siliceous particles. In one embodiment, the inorganic filler includes silica.

Many different precipitated silicas may be used, but those obtained by precipitation from an aqueous solution of sodium silicate using a suitable acid such as sulfuric acid, hydrochloric acid, or carbon dioxide are used most often. Such precipitated silicas are themselves known and processes for producing them are described in detail in U.S. Pat. Nos. 2,657,149; 2,940,830; and 4,681,750. Typical precipitated silicas can include those having a BET (five-point) surface area ranging from 20 to 500 $m^2$/gram, such as from 50 to 250 $m^2$/gram, or from 100 to 200 $m^2$/gram.

In one embodiment, at least 20 percent by weight, such as at least 50 percent by weight, or at least 65 percent by weight, or at least 75 percent by weight, or at least 85 percent by weight, of the filler in the composite can be silica. In one embodiment, silica can comprise 100 percent by weight of the filler present in the composite.

The weight ratio of the filler to the ultra high molecular weight polyethylene can range from 0.1 to 10, such as from 0.1 to 8.0, or from 0.1 to 5.0, or from 0.1 to 4.0, or from 0.1 to 3.0, or from 0.5 to 3.0, or from 1.0 to 2.0.

As obtained, the composite has a network of interconnecting pores communicating throughout the particulate composite. In one embodiment, the pores constitute at least about 35 percent by volume of the composite. In one embodiment the pores constitute at least about 60 percent by volume of the composite. In one embodiment the pores constitute from at least about 35 percent to about 95 percent by volume of the composite. In one embodiment the pores constitute from about 60 percent to about 75 percent by volume of the composite. As used herein and in the claims, the porosity (also known as void volume) of the composite, expressed as percent by volume, is determined according to the equation: Porosity=100 $[1-d_1/d_2]$ where $d_1$ is the density of the sample which is determined from the sample weight and the sample volume as ascertained from measurements of the sample dimensions and $d_2$ is the density of the solid portion of the sample which is determined from the sample weight and the volume of the solid portion of the sample. The volume of the solid portion of the same is determined using a Quantachrome stereopycnometer (Quantachrome Corp.) in accordance with the accompanying operating manual.

As used in the rubber composition, the composite is comminuted into a particulate form, to facilitate mixing and dispersion into the rubber. Comminution of the composite may be done using various methods as are known in the art, including shredding, grinding or cutting. The composite is obtained in the form of flakes with thickness in a range from 100 to 500 microns and lateral dimensions in a range from 0.4 to 3.0 centimeters.

The rubber composition includes at least one diene based rubber. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are natural rubber, synthetic polyisoprene, polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

In one embodiment, cis 1,4-polybutadiene rubber (BR) is used. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from −95 to −105° C. Suitable polybutadiene rubbers are available commercially, such as Budene® 1207 from Goodyear and the like.

In one embodiment, a synthetic or natural polyisoprene rubber may be used.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica not including that in the composite. The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. No. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition for use in the tire component may additionally contain a sulfur containing organosilicon compound. Examples of suitable sulfur containing organosilicon compounds are of the formula:

$$Z\text{—}Alk\text{—}S_n\text{—}Alk\text{—}Z \qquad I$$

in which Z is selected from the group consisting of

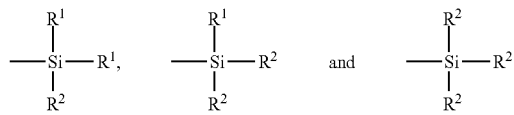

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl) trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

In one embodiment the sulfur containing organosilicon compounds are the 3,3'-bis(trimethoxy or triethoxy silylpropyl)sulfides. In one embodiment the compounds are 3,3'-bis(triethoxysilylpropyl)disulfide and 3,3'-bis(triethoxysilylpropyl)tetrasulfide. Therefore as to the above formula I, in one embodiment Z is

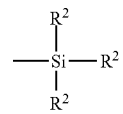

where $R^6$ is an alkoxy of 2 to 4 carbon atoms, with 2 carbon atoms being used in one embodiment; alk is a divalent hydrocarbon of 2 to 4 carbon atoms with 3 carbon atoms being used in one embodiment; and n is an integer of from 2 to 5 with 2 and 4 being used in one embodiment.

The amount of the sulfur containing organosilicon compound of the above formula in a rubber composition will vary depending on the level of other additives that are used. Generally speaking, the amount of the compound of the above formula will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include diphenylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

Example 1

In this example, preparation and testing of rubber compositions containing a thermoplastic/filler composite is illustrated.

Rubber compound samples were prepared using a three step mixing procedure following the general recipe shown in Table 1, with all amounts given in phr. In addition, the samples included filler added as indicated in Table 2.

Samples (for viscoelastic and stress-strain measurements) were cured for ten minutes at 170° C. and tested for physical properties as shown in Table 3. Stress-strain properties were measured using a Zwick 1445 Universal Testing System (UTS).

Table 3 shows a direct comparison of ultra high molecular weight polyethylene (UHMWPE) and a thermoplastic/filler composite at 5 phr or 10 phr added in the first non-productive stage in mixing (NP1). At both loading levels abrasion resistance is clearly improved with the composite over UHMWPE. There is also improved elongation which favors better chip and chunk resistance which also supports abrasion resistance. Another indicator for better abrasion resistance is the white surface area (%) as given by optical dispersion measurements (dispergrader), where a better filler dispersion in the polymeric matrix favors better abrasion resistance. Photomicrographs of Samples 1, 4 and 5 shown in FIGS. 1(a), 1(b), and 1(c), respectively, evidence better dispersion: the apparent particle size of dispersed composite particles is smaller (<=2 μm) than UHMWPE particles.

Compared to UHMWPE, the composite mixed in NP1 provides better polymer-filler interaction as shown by the higher modulus ratio (M300/M100) and lower hardness as shown in Table 3.

TABLE 1

| Non-Productive Mix Steps | |
|---|---|
| Polybutadiene[1] | 45 |
| Styrene-Butadiene[2] | 55 |
| Carbon Black | 5 |

TABLE 1-continued

| | |
|---|---|
| Antidegradant[3] | 2.5 |
| Process Oil[4] | 40 |
| Stearic Acid | 3 |
| Waxes[6] | 1.5 |
| Silane polysulfide[5] | 6.5 |
| Productive Mix Step | |
| Antidegradant[7] | 0.5 |
| Zinc Oxide | 2.5 |
| Sulfur | 1.4 |
| Accelerators[8] | 4.1 |

[1]High cis polybutadiene, obtained as Budene 1207 from The Goodyear Tire & Rubber Company
[2]Solution polymerized styrene butadiene rubber containing about 30 percent by weight of styrene, as SLF30H41 from The Goodyear Tire & Rubber Company
[3]p-phenylene diamine type
[4]low PCA type
[5]50 percent by weight on carbon black
[6]paraffinic and microcrystalline types
[7]mixed p-phenylene diamine type
[8]sulfenamide and guanidine types

TABLE 2

| | Sample No. | | | | |
|---|---|---|---|---|---|
| | 1 | 2 | 3 | 4 | 5 |
| First Non-Productive Mix Step | | | | | |
| Silica | 105 | 100 | 100 | 90 | 90 |
| TP/Filler Composite[9] | 0 | 0 | 5 | 0 | 10 |
| UHMWPE[10] | 0 | 5 | 0 | 10 | 0 |

[9]Composite of ultra high molecular weight polyethylene and silica, as Teslin ® SP1400 from PPG, with silica having a BET of 150-165m²/g, 60-65% porosity, pore size 5-20 μm, silica/polymer 2.0 wt/wt, specific gravity 683 kg/m³, shredded to flakes with a nominal thickness of 350 microns and lateral dimensions in a range from 0.4 to 2.0 centimeters.
[10]Ultra high molecular weight polyethylene e.g. GUR 4120 from Ticona

TABLE 3

| | Sample No. | | | | |
|---|---|---|---|---|---|
| | 1 | 2 | 3 | 4 | 5 |
| Stress-Strain Properties (Samples Cured 10 min at 170 C.) Ring Modulus (ASTM D412) | | | | | |
| Elongation [%] | 551 | 499 | 520 | 555 | 605 |
| Modulus 300% [MPa] | 7 | 8.7 | 7.6 | 8.5 | 6.4 |
| Modulus ratio | 4.7 | 4.1 | 4.5 | 3.6 | 4.1 |
| Hardness ASTM D2240 type A | | | | | |
| Shore A (23 C.) | 63 | 67 | 64 | 68 | 61 |
| Shore A (−10 C.) | 70 | 74 | 71 | 75 | 67 |
| Abrasion (Grosch[1]) | | | | | |
| Rating | 100 | 93 | 108 | 86 | 117 |

[1]The Grosch abrasion rate run on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons, 2° slip angle, disk speed of 40 km/hr for a distance of 7,500 meters; a medium abrasion severity test may be run, for example, at a load of 40 Newtons, 6° slip angle, disk speed of 20 km/hr and distance of 1,000 meters; a high abrasion severity test may be run, for example, at a load of 70 Newtons, 12° slip angle, disk speed of 20 km/hr and distance of 250 meters; and an ultra high abrasion severity test may be run, for example, at a load of 70 Newtons, 16° slip angle, disk speed of 20 km/hr and distance of 500 meters. See e.g. K. A. Grosch, Rubber Abrasion and Tire Wear, Rubber Chemistry and Technology: July 2008, Vol. 81, No. 3, pp. 470-505.

Example 2

In this example, preparation and testing of rubber compositions containing a thermoplastic/filler composite is further illustrated, with compounds made using the base formulation shown in Table 4 but with filler as indicated in Table 5.

Two mixing protocols were applied to get different dispersion state of composite filler in the compound i.e. Composite filler added in the first non-productive (NP1) or in the second non-productive mixing stages (NP2). The NP1 and NP2 mix stages are distinguished by the maximum temperature attained during mixing, for NP1 being higher than 140° C. and for NP2 being lower than 120° C. The selected maximum temperatures attained in NP1 and NP2 directly determines the melting or non-melting of the composite filler and UHMWPE in the compound.

Table 6 summarizes the mechanical properties of studied compounds. Indicated by higher modulus ratio (M300/M100) and lower Shore A hardness, better polymer-filler interaction is obtained with the composite filler over UHMWPE for NP1 mixed compounds. In addition, the composite filler allows for lower viscosity (ease of processing), higher elongation at break and higher tear strength.

TABLE 4

| | |
|---|---|
| Non-Productive Mix Steps | |
| Natural Rubber | 55 |
| Polybutadiene[1] | 30 |
| Styrene-Butadiene[2] | 15 |
| Carbon Black | 5 |
| Antidegradant[3] | 2.5 |
| Process Oil[4] | 50 |
| Stearic Acid | 3 |
| Waxes[6] | 1.5 |
| Silane polysulfide[5] | 5.6 |
| Productive Mix Step | |
| Antidegradant[7] | 0.5 |
| Zinc Oxide | 2.5 |
| Sulfur | 1.6 |
| Accelerators[8] | 3.4 |

[1]High cis polybutadiene, obtained as Budene 1207 from The Goodyear Tire & Rubber Company
[2]Emulsion polymerized styrene butadiene rubber containing about 23 percent by weight of styrene
[3]p-phenylene diamine type
[4]low PCA type
[5]50 percent by weight on carbon black
[6]paraffinic and microcrystalline types
[7]mixed p-phenylene diamine type
[8]sulfenamide and guanidine types

TABLE 5

| | Sample No. | | | | |
|---|---|---|---|---|---|
| | 6 | 7 | 8 | 9 | 10 |
| First Non-Productive Mix Step | | | | | |
| Silica | 90 | 85 | 85 | 85 | 85 |
| TP/Filler Composite | 0 | 5 | 0 | 0 | 0 |
| UHMWPE | 0 | 0 | 0 | 5 | 0 |
| Second Non-Productive Mix Step | | | | | |
| TP/Filler Composite[9] | 0 | 0 | 5 | 0 | 0 |
| UHMWPE[10] | 0 | 0 | 0 | 0 | 5 |

TABLE 6

| | Sample No. | | | | |
|---|---|---|---|---|---|
| | 6 | 7 | 8 | 9 | 10 |
| Stress-Strain Properties (Samples Cured 10 min at 170 C.) Ring Modulus (ASTM D412) | | | | | |
| Modulus 300% [Mpa] | 6.0 | 6.0 | 6.2 | 6.7 | 6.9 |
| Modulus ratio | 5.2 | 4.8 | 4.3 | 4.2 | 4.6 |
| Elongation [%] | 603 | 624 | 480 | 598 | 555 |

TABLE 6-continued

| | Sample No. | | | | |
|---|---|---|---|---|---|
| | 6 | 7 | 8 | 9 | 10 |
| Hardness ASTM D2240 type A | | | | | |
| Shore A (−10 C.) | 55 | 58 | 57.1 | 62.8 | 57.1 |
| Shore A (23 C.) | 52.2 | 55.2 | 55.1 | 59.2 | 54.5 |
| DIN Abrasion (ASTM D5963, DIN 53516) | | | | | |
| Rating | 100 | 110 | 107 | 121 | 103 |
| Tear Strength[1] Cure: 10 min @ 170° C.; Test:@ 100° C., Adhesion to Itself | | | | | |
| Tear Strength (N/mm) | 30.9 | 33.3 | 26.7 | 29.5 | 28.2 |
| Mooney Viscosity (ML 1 + 4, 100° C., ASTM D1646, Mooney units) | | | | | |
| Original viscosity | 25 | 29.2 | 26.2 | 35.9 | 23.7 |

[1]ASTM D4393 except that a sample width of 2.5 cm is used and a clear Mylar plastic film window of a 5 mm width is inserted between the two test samples. It is an interfacial adhesion measurement (pulling force expressed in N/mm units) between two layers of the same tested compound which have been co-cured together with the Mylar film window therebetween. The purpose of the Mylar film window is to delimit the width of the pealed area.

Example 3

The compounds of Example 2 were tested using a linear tribometer installed in a cold chamber. The details of friction testing on laboratory ice can be found in the literature [Tibor Fülöp, An J. Tuononen, Evolution of ice surface under a sliding rubber block, Wear, Volume 307, Issues 1-2, 30 Sep. 2013, Pages 52-59]. The tests are performed at two distinct test conditions to capture the behavior of a tire tread compound when driving on icy roads.

The friction test results are reported in Table 7. The compound Sample 7 which contains composite filler mixed in NP1 is superior in friction coefficient to the control compound Sample 6 without composite filler and UHMWPE. The composite filler in the compound Sample 7 shows better performance than UHMWPE in the compounds Sample 10 and Sample 11. It has to be noted that compound containing the composite filler is not able to show the friction performance when mixed in NP2 indicating a specific morphology that is formed by applying a specific mixing condition is responsible for the reported friction performance gain.

TABLE 7

| | Sample No. | | | | |
|---|---|---|---|---|---|
| | 6 | 7 | 8 | 9 | 10 |
| | Average friction coefficient on ice | | | | |
| test condition 1 | 0.202 | 0.209 | 0.140 | 0.160 | 0.197 |
| test condition 2 | 0.294 | 0.350 | 0.207 | 0.242 | 0.313 |

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising at least one component, the at least one component comprising a rubber composition, the rubber composition comprising:
   at least one diene based elastomer; and
   from 1 to 30 parts by weight, per 100 parts by weight of elastomer (phr), of a particulate composite comprising ultra high molecular weight polyethylene, an inorganic filler, and a network of interconnecting pores communicating throughout the particulate composite, the pores constituting at least 35 percent by volume of the particulate composite.

2. The pneumatic tire of claim 1, wherein the ultra high molecular weight polyethylene has an intrinsic viscosity ranging from 10 to 39 deciliters/gram.

3. The pneumatic tire of claim 1, wherein the ultra high molecular weight polyethylene has an intrinsic viscosity ranging from 18 to 39 deciliters/gram.

4. The pneumatic tire of claim 1 wherein the inorganic filler is silica.

5. The pneumatic tire of claim 1 wherein the weight ratio of the filler to the ultra high molecular weight polyethylene ranges from 0.5 to 3.0.

6. The pneumatic tire of claim 1, wherein the pores constitute from about 60 percent to about 75 percent by volume of the particulate composite.

* * * * *